United States Patent [19]
Oakes

[11] 3,992,799
[45] Nov. 23, 1976

[54] ROD SECTIONS RETAINING SOCKET & BRACKET

[76] Inventor: DuWayne E. Oakes, 8515 94th St., SW., Tacoma, Wash. 98498

[22] Filed: June 24, 1975

[21] Appl. No.: 589,681

[52] U.S. Cl. .............................. 43/25; 24/81 CC; 24/257 R
[51] Int. Cl.²........................................ A01K 87/02
[58] Field of Search ............... 43/25, 26; 24/81 CC, 24/257

[56] References Cited
UNITED STATES PATENTS

| | | | |
|---|---|---|---|
| 831,150 | 9/1906 | Fraser | 43/25 |
| 3,113,363 | 12/1963 | Fyvie | 43/25 X |
| 3,169,290 | 2/1965 | Snodgrass | 43/25 X |

Primary Examiner—Hugh R. Chamblee
Assistant Examiner—Daniel J. Leach
Attorney, Agent, or Firm—Clarence A. O'Brien; Harvey B. Jacobson

[57] ABSTRACT

Apparatus for use in releasably fastening together in substantially parallel, side-by-side relation a plurality of rod sections selectively attached one to another in end-to-end relation to form a fishing rod. The apparatus comprises a support member provided with a pair of sockets arranged for receiving the butt of the handle section and the male ferrule of the tip section of the rod. Where a large eye is not provided on the handle section of the rod for receiving the tip end of the tip section of the rod, the apparatus includes a bracket provided with a socket arranged for receiving the female ferrule or rod portion of the handle section of the rod and a clip arranged for retaining and engaging the tip end of the tip section of the rod.

8 Claims, 7 Drawing Figures

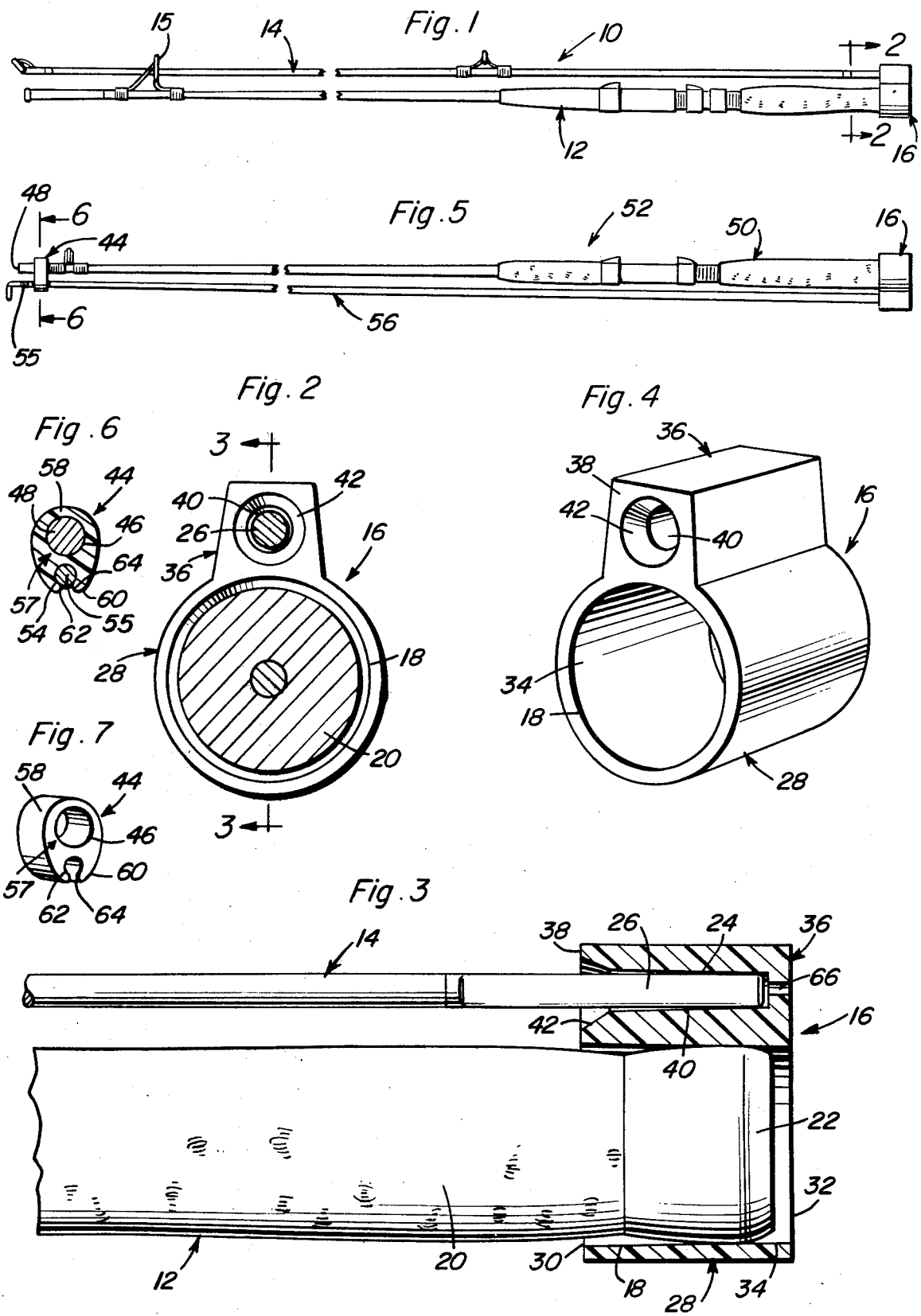

3,992,799

ROD SECTIONS RETAINING SOCKET & BRACKET

BACKGROUND OF THE INVENTION

1. Field of the Invention

This invention relates generally to retaining apparatus, and more particularly to apparatus for use in releasably fastening together in substantially parallel, side-by-side relation a plurality of sections which selectively attach to one another in end-to-end relation to form a fishing rod.

2. Description of the Prior Art

A problem arises when using the conventional spinning and other comparable fishing rod as to how to store and handle the sections of the rod when the sections are in their disassembled mode. For example, fishermen who use spinning rods provided with a large top eye in the handle section of the rod generally insert the tip end of the tip, or top, section of the rod through the large eye of the handle section to hold the two sections together compactly when their rods are not assembled for fishing. The opposite ends of the fishing rods thus interengaged, however, will still flop around when not being securely retained together at the ends thereof opposite to the interengagement of eye and tip. Further, many fishing rods do not include such a large eye on the forward end of the handle section of the rod, and therefore are not even conducive to such interengaging arrangement.

Various devices have been proposed for fastening together the various sections of a fishing rod when disassembled and not in use. Examples of such known apparatus may be found in U.S. Pat. Nos. 3,113,363, issued Dec. 10, 1963 to D. J. Fyvie, 2,595,746, issued May 6, 1952 to H. R. Zinn, 3,169,290, issued Feb. 16, 1955 to H. F. Snodgrass, and 396,909, issued Jan. 29, 1889 to J. Annin. These known devices, however, are generally usable only with specially constructed fishing rods, the construction of which rods is not necessarily conventional or standard today. Further, these known devices are generally of a rather complex nature with associated high initial cost and low reliability.

U.S. Pat. No. 2,980,305, issued Apr. 18, 1961 to F. B. Reese, is also believed to be pertinent to the present invention.

SUMMARY OF THE INVENTION

It is an object of the present invention to provide apparatus for use in releasably fastening together in substantially parallel, side-by-side relation a plurality of fishing rod sections which is simpler in construction, more flexible in use, and more reliable in operation than known apparatus of this kind.

It is another object of the present invention to provide fishing rod section retaining apparatus usable with most of the spinning and similar fishing rod available on today's market.

These and other objects are achieved according to the present invention by providing apparatus having: a support member provided with a first socket for receiving the handle section of a fishing rod, and a second socket separate from the first socket for receiving the male ferrule of a tip, or top, section of the fishing rod so as to retain the handle and tip sections in substantially side-by-side relation when the sections are in their disassembled mode.

A preferred form of the support includes a generally hollow, substantially cylindrical portion forming the first socket, with the cylindrical portion having a pair of spaced openings and an inner surface arranged between the openings for gripping the butt end of the handle section of the fishing rod. According to an advantageous feature of the present invention, the inner surface of the cylindrical portion of the support member is tapered away from one of the openings for facilitating placement of the butt of the handle section of a fishing rod through the one of the openings and into the cylindrical portion for retention thereby. The support member further includes a block portion mounted on, and advantageously integral with, the cylindrical portion, and having a substantially planar surface generally planar with a surface of the cylindrical portion in which the one of the openings is defined and provided with a bore forming the second socket. Advantageously, the bore is also tapered away from the substantially planar surface for facilitating insertion of a male ferrule of the tip, or top, section of a fishing rod being retained. Further, the bore may be provided with a flared portion immediately adjacent the planar surface for further facilitating insertion of a male ferrule into the bore.

The apparatus also advantageously further includes a bracket provided with a third socket arranged for selectively receiving a female ferrule or rod portion of the handle section of a fishing rod being retained. Such a bracket is particularly useful with fishing rods not provided with a large eye on the forward end of the handle section of the rod, and the bracket further includes a clip provided in such a manner as to selectively receive a tip end of the tip, or top, rod section associated with the handle section of the rod for securing the tip end of the tip section adjacent the forward, or ferrule, end of the handle section of the rod.

The bracket preferably includes a body of substantially ovate cross section and having a broad end and a narrow end. The third socket is advantageously a hole through the broad end of the body of the bracket, with the clip being a recess provided in the narrow end of the bracket body.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary, side elevational view showing rod section retaining apparatus according to the present invention retaining one kind of conventional fishing rod.

FIG. 2 is a sectional view taken generally along line 2—2 of FIG. 1, but drawn to a larger scale.

FIG. 3 is a fragmentary, sectional view taken generally along the lines 3—3 of FIG. 2.

FIG. 4 is a perspective view showing the part of the apparatus according to the present invention which is employed to retain the fishing rod shown in FIG. 1.

FIG. 5 is a fragmentary, side elevational view, similar to FIG. 1, but showing apparatus according to the present invention retaining a different kind of fishing rod.

FIG. 6 is a sectional view taken generally along the line 6—6 of FIG. 5, but drawn to a larger scale, and showing the second part of the retaining apparatus according to the present invention.

FIG. 7 is a perspective view showing the part of the retaining apparatus seen in FIG. 6.

DESCRIPTION OF THE PREFERRED EMBODIMENTS

Referring now more particularly to FIGS. 1 and 2 of the drawings, a conventional fishing rod 10 comprising a handle section 12 and a tip section 14 is shown wherein apparatus according to the present invention is releasably fastening together in substantially parallel, side-by-side relation handle section 12 and tip section 14, with the sections 12, 14 selectively attachable one to another in end-to-end relation to form a usable fishing rod. Since the manner in which a fishing rod 10 is formed from sections 12, 14 is conventionally well known, it is not shown in the drawings or described herein.

The part of the fastening apparatus according to the present invention used to retain the sections 12, 14 of rod 10 in side-by-side relation, where rod 10 has a handle section 12 provided with a large forward eye 15, includes a support member 16 provided with a first socket 18 arranged for receiving the portion of handle 20 of handle section 12 forming the butt 22 of the rod 10, and a second socket 24 separate from socket 18 and arranged for receiving the male ferrule 26 of tip section 14 of rod 10. The arrangement of the sections 12, 14 in the sockets 18, 24 is perhaps best seen in FIG. 3 of the drawings.

Still referring to FIG. 3 of the drawings, as well as to FIG. 4, support member 16 includes a generally hollow, substantially cylindrical portion 28 forming first socket 18. Cylindrical portion 28 has a pair of spaced openings 30 and 32, and an inner surface 34, substantially cylindrical in nature, arranged between openings 30 and 32 for gripping the butt 22 of handle section 12 of rod 10. Inner surface 34 is advantageously tapered in the illustrated manner away from opening 30 for facilitating placement of handle section 12 through opening 30 and into cylindrical portion 28. By proper design, the taper of inner surface 34 will be such as to prevent butt 22 of handle section 12 from sliding completely through cylindrical portion 28 and out opening 32.

Support member 16 further includes a block portion 36 mounted on, and integral with, cylindrical portion 28, and having a substantially planar surface 38 provided with a bore 40 forming socket 24. Like socket 18, bore 40 advantageously tapers away from planar surface 38, which is arranged generally perpendicular to the extent of socket 18, for facilitating insertion of male ferrule 26, with the portion of bore 40 immediately adjacent surface 38 being flared toward the surface 38, as at 42, to further facilitate insertion of ferrule 26.

Referring now to FIGS. 5–7 of the drawings, a fishing rod is shown of the type not having a large eye 15 which facilitates fastening together of the sections of the rod when same are in their disassembled, or unused, mode. More specifically, the fastening apparatus includes, in addition to support member 16, a bracket 44 provided with a third socket 46 arranged for selectively receiving a female ferrule 48 or rod portion of the handle section 50 of a fishing rod 52. As can be readily seen in FIG. 5, ferrule 48 of section 50 is spaced from the butt of handle section 50, the butt being the end on which support member 16 is disposed. A clip 54 is also provided on bracket 44 for selectively receiving tip 55 of the tip section 56 of rod 52. As also can be seen from FIG. 5, tip section 56 is received, in the end thereof having a male ferrule, in the socket of support member 16 which was designated socket 24 with regards to the description of FIGS. 1–4 of the drawings.

Bracket 44 includes a body 57 of substantially ovate cross section and having a broad end 58 and a narrow end 60. Socket 46 is in the form of a hole completely through the broad end 58 of body 57, while clip 54 is formed by a recess 62 provided in the narrow end 60 of body 57 and communicating with the surface of narrow end 60 as by a restricted passage 64. As will be appreciated, tip 55 of tip section 56 may be pushed through passage 64 and into recess 62 to be retained by the clip 54 formed by the aforementioned passage and recess.

An advantageous feature of both support member 16 and bracket 44 is that they are flexible, being constructed from a material which will stretch and grip — such as rubber, silicone, nylon, or other elastic natural and synthetic materials. Because the flexible fishing rod socket or support member 16 is flexibly firm and has a flared, tapered socket 24 for male ferrule 26 to be inserted into, it will easily accommodate rods with either tapered or straight ferrules, thus protecting the ferrules and holding the rod firmly in place. The hole 66 at the end of socket 24 (FIG. 3) permits easier removal of the rod sections from socket 24 by preventing a suction to be formed in the socket. Although block portion 36 may be affixed with a suitable adhesive, such as a friction tape, and the like, to handle 20 of a handle section 12 of the fishing rod 10, the flexibility of the material forming support member 16 enables the ring or cylindrical portion 28 to fit handles of fishing rods with different shaped ends than that illustrated. Further, the flexible fishing rod support member 16 may be constructed in different sizes to accommodate rods of different sizes.

As mentioned above, cylindrical portion 28 is also advantageously, but not necessarily, provided with a tapered inner surface 34 so as to allow easier placement of the ends of the handles of fishing rods within the support member 16.

As mentioned above, both support member 16 and bracket 14 may be constructed in various sizes to accommodate fishing rods and handles of different sizes, and are preferably made of a material which will flex, yet permit the rod to be easily inserted into the sockets and clips of the member 16 of bracket 44 so as to be held firmly in place.

As will be appreciated from the above description and from the drawings, apparatus according to the invention will permit fishing rods of various sizes and styles to be disassembled into their component sections and securely held together in a compact manner without danger of damage to the ferrules and other elements of the sections of the rod.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Apparatus for use in releasably fastening together in substantially parallel, side-by-side relation a plurality of rod sections selectively attachable one to another in end-to-end relation to form a fishing rod, the apparatus comprising a support member provided with a first socket means for receiving the handle section of a fishing rod, and a second socket means, separate from the first socket means, for receiving the male ferrule of a tip section of the fishing rod, the support member including a generally hollow portion forming the first socket means, the portion having an opening, and an inner surface arranged extending from the opening for receiving a butt of the handle section of the fishing rod.

2. A structure as defined in claim 1, further including a bracket provided with third socket means for selectively receiving a female ferrule of the handle section of the fishing rod, the female ferrule of the handle section being spaced from a butt of the handle section, and a clip provided on the bracket for selectively receiving a tip of the tip section of the rod, which tip section has the male ferrule received in the second socket means.

3. A structure as defined in claim 2, wherein the bracket includes a body of substantially ovate cross section having a broad end and a narrow end, the third socket means being a hole through the broad end of the body transverse to the ovate cross section of the body, and the clip being a recess provided in the narrow end of the body, also transverse to the cross section of the body, and a passage communicating with the recess and a surface of the body at the narrow end thereof.

4. A structure as defined in claim 1, wherein the inner surface of the hollow portion is cylindrical and tapered away from the opening provided in the hollow portion for facilitating placement of the butt of the handle through the opening and into the hollow portion for retention thereby.

5. A structure as defined in claim 4, wherein the hollow portion is cylindrical and has a pair of spaced openings, and the support member further includes a block portion mounted on, and integral with, the cylindrical portion and having a substantially planar surface lying substantially in the plane of one of the openings from which the inner surface of the cylindrical portion is tapered, and provided with a bore forming the second means, the bore tapering away from the substantially planar surface for facilitating insertion of the male ferrule into the second socket means.

6. A structure as defined in claim 5, wherein the bore is flared toward the substantially planar surface immediately adjacent the planar surface and wherein the support member is constructed from a flexible material which will stretch and grip the handle and ferrule inserted into the first and second socket means, respectively.

7. A structure as defined in claim 6, further including a bracket provided with third socket means for selectively receiving the female ferrule of the handle section of the fishing rod, the female ferrule of the handle section being spaced from the butt of the handle section, and a clip provided on the bracket for selectively receiving a tip of the rod section received in the second socket means.

8. A structure as defined in claim 7, wherein the bracket includes a body of substantially ovate cross section having a broad end and a narrow end, the third socket means being a hole through the broad end of the body transverse to the ovate cross section of the body, and the clip being a recess provided in the narrow end of the body, also transverse to the cross section of the body, and a passage communicating with the recess and a surface of the body at the narrow end thereof.

* * * * *